US007727634B2

(12) United States Patent
Yacovone

(10) Patent No.: US 7,727,634 B2
(45) Date of Patent: Jun. 1, 2010

(54) DECORATIVE GLASS LAMINATE CONTAINING AN ULTRAVIOLET PRINTED IMAGE THEREON AND A METHOD FOR PREPARING SAID DECORATIVE GLASS LAMINATE

(75) Inventor: Vincent J. Yacovone, Springfield, MA (US)

(73) Assignee: Solutia, Inc., St. Louis, MO (US)

( * ) Notice: Subject to any disclaimer, the term of this patent is extended or adjusted under 35 U.S.C. 154(b) by 818 days.

(21) Appl. No.: 11/193,885

(22) Filed: Jul. 29, 2005

(65) Prior Publication Data

US 2006/0078716 A1    Apr. 13, 2006

Related U.S. Application Data

(63) Continuation-in-part of application No. 10/443,541, filed on May 22, 2003, now abandoned, which is a continuation-in-part of application No. 10/135,417, filed on Apr. 30, 2002, now Pat. No. 6,824,868.

(51) Int. Cl.
*B32B 17/00* (2006.01)
*B32B 9/00* (2006.01)
*B32B 17/10* (2006.01)

(52) U.S. Cl. .................. 428/441; 428/343; 428/436; 428/480; 428/542.2; 428/426; 428/437; 428/354; 428/355 AK; 428/355 AC; 428/213; 428/220; 428/210

(58) Field of Classification Search .............. 428/343, 428/346, 354, 355 AK, 355 EN, 355 AC, 428/355 N, 13, 29, 31, 187, 220, 213, 426, 428/428, 436, 437, 441, 442, 412, 413, 542.2, 428/542.6, 480, 474.4, 500, 501, 515, 524, 428/525
See application file for complete search history.

(56) References Cited

U.S. PATENT DOCUMENTS

| 4,364,786 | A   | * | 12/1982 | Smith et al. ............... 156/99 |
| 4,980,108 | A   | * | 12/1990 | Suzuki et al. ............. 264/134 |
| 6,839,128 | B2  | * | 1/2005 | Premjeyanth et al. ....... 356/71 |
| 2003/0161997 | A1 | * | 8/2003 | Moran ..................... 428/172 |
| 2003/0180541 | A1 | * | 9/2003 | Naik et al. ............. 428/423.1 |
| 2005/0118401 | A1 | * | 6/2005 | Smith et al. ............. 428/201 |

FOREIGN PATENT DOCUMENTS

WO    WO 2004/018197    *    3/2004

OTHER PUBLICATIONS

U.S. Appl. No. 60/483,516, filed Jun. 26, 2003.*

* cited by examiner

*Primary Examiner*—Ling Xu
(74) *Attorney, Agent, or Firm*—Dowell & Dowell, PC; Robert J. Feltovic; John P. Foryt

(57) ABSTRACT

This invention is directed to a plastic composite comprising color images printed onto a polymeric support film using UV ink. The polymeric support film layer may be bonded to a polymeric film selected from the group consisting of aliphatic polyurethane and ethyl vinyl acetate. The combined laminate can then optionally be disposed between two layers of plasticized PVB, forming the plastic composite. The plastic composite can then be placed between two sheets of glass forming the final laminated glass product. Preferably, when the UV image is printed on the polymeric support film, the image is only partially cured by a UV lamp. After the polymeric support film is contacted with the polymeric film, with the partially cured UV image therebetween, the laminate is exposed to a second UV lamp operating at full power so as to completely cure the UV image.

30 Claims, 2 Drawing Sheets

DECORATIVE GLASS LAMINATE CONTAINING AN ULTRAVIOLET PRINTED IMAGE THEREON AND A METHOD FOR PREPARING SAID DECORATIVE GLASS LAMINATE

CONTINUITY INFORMATION

This application is a continuation-in-part application of and claims priority from U.S. patent application Ser. No. 10/443,541, filed May 22, 2003, which in turn is a continuation-in-part application of and claims priority from U.S. patent application Ser. No. 10/135,417, filed Apr. 30, 2002, now U.S. Pat. No. 6,824,868.

BACKGROUND

There is significant commercial interest in the fabrication of customized glass laminates with encapsulated digitally printed images having vibrant colors for use in architectural and automotive applications. Because project delivery times for current methods of producing limited quantities of glass laminates with customized graphics can be very long with accompanying high costs, there is a strong market need for methods that will allow rapid turnaround time at reasonable cost.

Introduction of digital methods, such as inkjet printing, is a natural fit for production of glass laminates with customized graphics. A major advantage of digital printing is the minimal setup times required to produce an image which reduces the cost and turnaround time of a short run as compared to traditional screen printing operations.

Inkjet printing is usually a wet-imaging and non-contact process where a vehicle or carrier fluid is energized to "jet" ink components from a printhead over a small distance onto a substrate. The vehicle is normally solvent or aqueous based and may contain dyes or pigments. Along with the chromophore, an inkjet ink formulation may contain humectants, surfactants, biocides and penetrants, among other ingredients. Inkjet technologies include continuous and drop-on-demand types. Drop-on-demand printing is the most common.

The use of digital printing provides a very quick means for preparing finished printed images, as digital image manipulation software such as Adobe's Photoshop® and/or Illustrator® in combination with the raster image processing (RIP) software can complete a full project from design to finished proof in a matter of hours as compared to days or longer for a traditional screen print process. The combination of digital printing and commercially available graphics software provides great opportunity for a wide range of customized aesthetics for use in laminated glass.

Therefore, there is a desire to improve glass laminates with customized graphics using the most modern inkjet printing technology available.

SUMMARY OF THE INVENTION

The intent of this invention is to achieve a glass laminate with an encapsulated digitally printed image that has overall performance characteristics including penetration resistance, optical quality and durability equivalent to a conventional glass/plasticized PVB/glass laminate. In particular, it is an object of the present invention to incorporate ultraviolet ("UV") curable ink systems into conventional glass laminate structures.

It has been found that color images can be printed onto a polymeric support film substrate, such as a PVB, PET or EVA substrate, using printing technology with UV curable ink formulations. This invention is directed to an interlayer for laminated glass, the interlayer comprising a polymeric support film supporting at least one color image printed with UV ink.

It further has been found that because of the acrylic content of most UV curable ink formulations, materials such as aliphatic polyurethane and ethyl vinyl acetate adhere much better to UV ink printed composites than do glass or another layer of PVB. This invention is directed to an interlayer for laminated glass, the interlayer comprising a polymeric support film supporting at least one color image printed with UV ink, and a polymeric film bonded to the printed side of the polymeric support film, such that the color image is between the polymeric support film and the polymeric film.

This invention particularly is directed to a plastic composite comprising color images printed onto a PVB, PET or EVA substrate using UV ink printing technology. The substrate is then bonded to a non-PVB polymeric film layer to complete the basic laminate. The bonded composite layer can then disposed between other polymeric layers, such as two layers of plasticized PVB, to form a multi-layer composite interlayer, or directly between two glass sheets to form the final laminated glass product. Also described herein is an improved method for preparing decorative glass laminate composite structures containing a UV printed image thereon.

DETAILED DESCRIPTION OF ILLUSTRATED EMBODIMENTS

Figure 1:
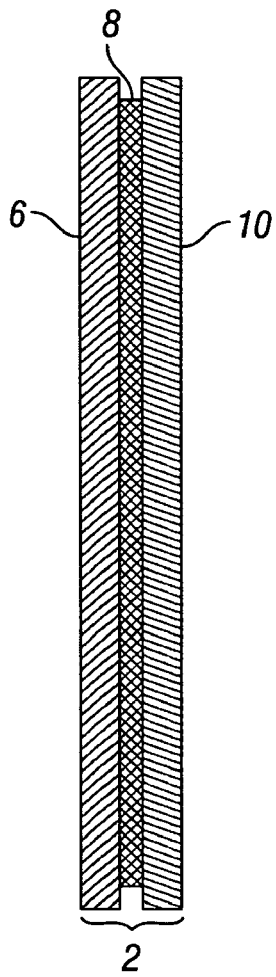
FIG. 1 shows one embodiment of the laminate of the present invention.

Recent advancements in inkjet printing have been focused on developing ultra-violet (UV) curable ink systems for inkjet printing systems. UV-curable inks have become the chemistry of choice for many commercial printing operations, including screen printing compact disks, chemical resistant signs and point of sale displays, offset printing covers for annual reports, high quality brochures, magazines, books and directories, and value-added packaging, flexograph and letterpress printing of high quality labels.

Unlike standard inks, UV curable ink essentially does not contain any solvent that otherwise must evaporate during the curing phase. The cure takes place through the interaction of the ink ingredients and a strong UV light source. Since UV ink contains little or no solvent, it contains far less VOCs (volatile organic compounds) than regular inks. Reducing VOCs is a very environmentally friendly practice, and the cost savings in permitting and reporting VOC use, as well as personal protection costs can be very significant.

UV cure reactors can also be run at very high production rates. The actual cross-linking of the UV ink takes place in one to three seconds, depending upon the color of the ink and the intensity of the UV light source. High cure rates translate into very high operating speeds. UV inks can be run on high-speed production equipment without having to allow for excessively large dryers, as would be necessary for high-speed solvent systems.

The rapid cure also allows UV inks to be used on a new generation of graphic presses that can do multiple colors in succession without having to move the substrate. Historically, graphic screen printing has been done on presses that did one color at a time. The substrate was printed, put through the dryer (or racked for air-drying), and then returned to the press for the next color. The new generation of graphic screen presses takes advantage of the UV cure rate and prints colors in succession with cure reactors between each print head. The production rates of these machines are generally very good.

UV ink also does not dry in the screen, making it very easy to work with. Printers do not have to worry about the ink clogging the mesh if they stop printing. The printer can work for extended periods without ever having to touch the screen. The result is excellent production throughput. It is quite common, with a good quality screen, to be able to run an entire print run without having to clean the mesh. The chances of being able to print a long run of solvent ink without having to clean the screen are very low.

Finally, UV ink has excellent color value. UV inks range in opacity from very transparent to translucent; there are no real opaque UV inks. The high level of transparency produces a very clean color gamut. This quality makes UV ink an exceptionally good choice for four-color process graphic printing. This clarity of color, combined with the very fine pigment grind and the fact that the ink does not dry in the screen allows UV ink to be printed through extremely high mesh counts. It is not unusual to see UV printed through mesh counts as high as 165 threads/cm (420 threads/inch) although 154 threads/cm (390 threads/inch) is much more common.

According to the present invention, UV curable inkjet printing now has been successfully applied to a polymeric support film interlayer material, such as polyethylene terephthalate (PET) and polyvinyl butyral (PVB) substrates. Conventional printing systems encounter problems as the result of poor adhesion between glass and/or plasticized PVB and printed film component because of solvent migration, as well as unacceptable interactions between the PVB plasticizer and the printed image itself on the printed film component or directly on PVB itself. Since the UV curable inks contain little or no solvent (the cure takes place through the interaction of the ink ingredients and a strong UV light source), plasticizer interaction with the printed surface now is minimized or eliminated.

Prints, specifically the printed area of the substrates, sometimes do not adhere very well to glass or another layer of PVB. This reduced adhesion may make some prints less desirable for use in some multi-layer laminate constructions such as decorative glass laminates, as the resultant laminate may not always satisfy certain shear requirements for some protective laminates.

One embodiment of the invention disclosed herein describes an interlayer for use in glass laminates as is shown in FIG. 1. The interlayer (2) comprises a printed composite structure that itself comprises a polymeric support film (6) having color images (8) printed thereon with UV curable ink. The printed side of the polymeric support film is then bonded to a protective, polymeric film (10). As used herein, an image can be a logo, symbol, geometric pattern, photograph, alphanumeric characters or combinations thereof. The term "color" includes all colors as well as black and white.

Among thermoplastic materials having the desired physical properties for use as the polymeric support film are polyvinyl butyral (PVB), polyethylene terephthalate (PET), polyurethane and ethyl vinyl acetate (EVA). If PET is used, it has preferably been biaxially stretched to improve strength and is also heat stabilized to provide low shrinkage characteristics when subjected to elevated temperatures (i.e. less than 2% shrinkage in both directions after 30 minutes exposure at 150° C.). The tensile modulus (at 21-25° C.) of PET is about $10^{10}$ Pa as compared with about $10^7$ Pa for plasticized PVB of the type used in safety glazings.

Merely adhering the printed polymeric support film to two adhesive layers, such as plasticized polyvinyl butyral, such as is commonly done in the glass laminate industry, sometimes does not appear to provide for a stable laminate composite structure. It is known, as mentioned above, that the printed areas of the printed polymeric support film sometimes do not adhere very well to glass or to another PVB support film. However, by adhering a specific polymeric film to the printed surface of the polymeric support film, the printed laminate composite is then stable enough to be bonded to glass or other adhesive layers. The polymeric film also has other advantages, such as acting as a barrier to migration of printed ink components, into the adhesive layers that can significantly affect the integrity of the glass laminate. It also acts as a 2-way barrier by protecting the print from interaction with the adhesive layer components, such as plasticizer contact as described above.

It has been found that because of the acrylic content of most UV curable ink formulations, materials such as aliphatic polyurethane and ethyl vinyl acetate adhere much better to UV ink, and therefore are fitting compositions for the polymeric film. Bonding the printed polymeric support film to a polymeric film comprising aliphatic polyurethane or ethyl vinyl acetate, results in significantly improved laminate performance. Alternatively, the polymeric film may comprise any sheet of thermoplastic material coated with either polyurethane or ethyl vinyl acetate. For example, in one embodiment the polymeric film may comprise a sheet of PVB coated with a layer of EVA. The coated side of the PVB sheet would then be bonded to the printed side of the polymeric support film.

Once a suitable polymeric support film has been selected for UV inkjet printing, the film is fed to a UV inkjet printer for application of the printed digital image. Typical inkjet printer operation involves feeding the recording media, here the polymeric support film, intermittently through the printer. When the recording media is stopped, the print head of the inkjet printer moves perpendicularly to the direction of travel of the recording media. While the head is moving, the inkjet printer emits ink particles onto the recording media from the head by means of a piezoelectric element or a heater. An image is then recorded on the recording medium by the operation of such an inkjet printer.

Figure 3:
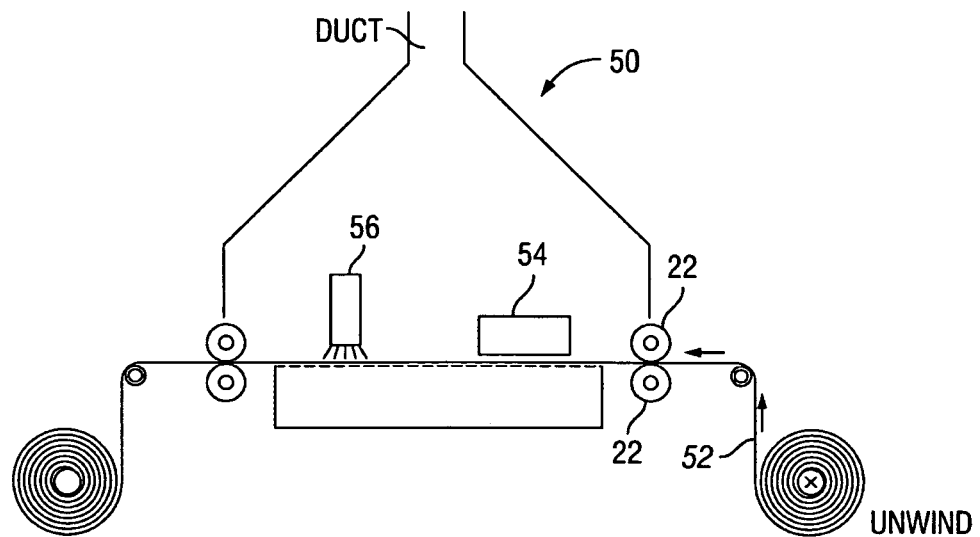
FIG. 3 shows a prior art process for curing UV ink on a glass laminate substrate.

Referring to FIG. 3, a mechanism of a traditional commercial UV printer is shown. UV ink used in an inkjet printer includes the active ray cure ink that is completely cured by application of active ray, including an ultraviolet ray and/or electron beam. The active ray cure ink is composed, for example, of color material, polymerizable monomer or oligomer, photopolymerization initiator for promoting monomer and oligomer crosslinking reaction and polymerization reaction by photocatalystic reaction, and photopolymerization accelerating agent. This ink is cured by crosslinking reaction or polymerization reaction by irradiation of active ray. The printer using such active ray cure ink for recording is less foul smelling than the printer using solvent based ink for recording, and is capable of recording on a recording medium having no ink absorbing ability.

An UV inkjet printer for recording with ultraviolet cure ink cured by ultraviolet ray is provided with a UV source emitting ultraviolet rays. This printer emits ink particles of ultraviolet cure ink from the head to the recording medium, and moves the recording medium or head, whereby ultraviolet ray is applied to the ink particles landed on the recording medium from the UV source. This allows ink particles landed on the recording medium to be cured. The UV source in traditional printing operations is usually operated at full power so as to fully cure the UV ink immediately upon application to the printing medium.

Figure 4:
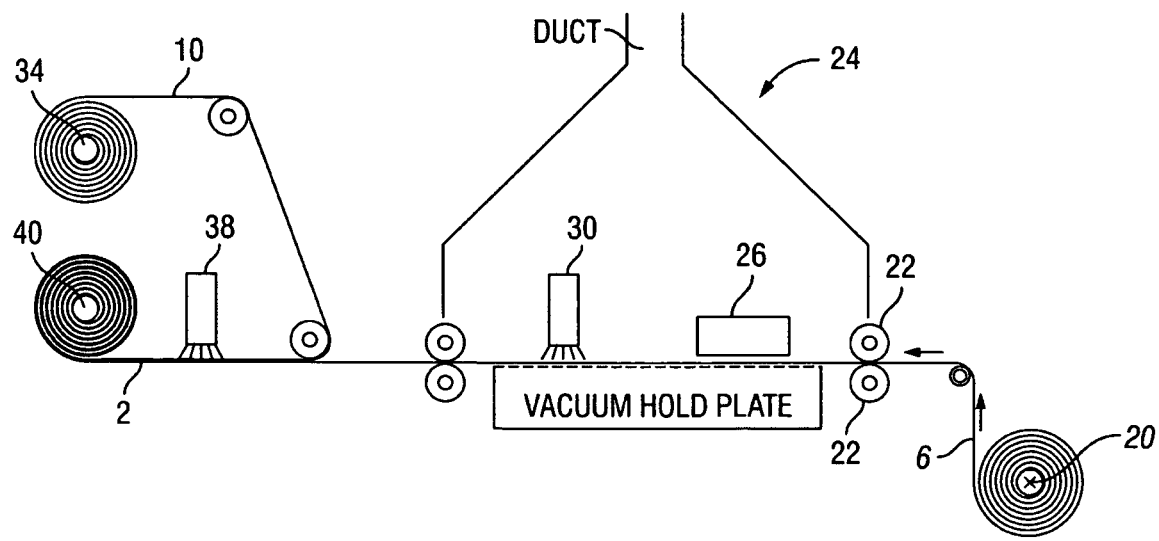
FIG. 4 shows one embodiment of the present invention directed to an improved process for curing UV ink on a glass laminate substrate.

However, in one embodiment of the present invention, shown in FIG. 4, the UV source in the UV inkjet printer is operated at a low power level so as to only partially cure the UV ink. Alternatively, the UV light source could be filtered to remove UV light below, at, or above a certain wavelength, which would also only partially cure the UV ink. This allows the ink to be deposited and held in position without becoming completely cured. As stated above, while UV ink has been successfully demonstrated on polymeric films, once printed and cured, the prints, specifically the printed area of the substrates, do not adhere very well to glass or another layer of PVB or PET.

Therefore, after the base polymeric support film (i.e. PVB, PET, PU, EVA film or the like) is printed upon with UV ink and the UV ink partially cured, a second polymeric film is applied on top of, or laminated to, the printed base polymeric support film using known techniques. Then the combined laminate structure can be passed under a second, possibly unfiltered, UV source operating at or near full power so as to completely cure the UV ink. This allows the UV ink to adhere to both layers above and below, and does not compromise the adhesion of the resulting laminate stack, as would be the case if the UV ink were completely cured before further combination with a second polymeric film.

In one embodiment of the present invention, the thickness of the second polymeric film, i.e. the film that covers the printed polymeric film, is less than or equal to one half the thickness of the printed polymeric film so as to minimize the haze of the laminate. For example, if an UV image was printed on a 10 mil thick PVB sheet and was covered by a sheet of polyurethane, in this embodiment the thickness of the polyurethane would be 5 mils or less.

A general overview of the process is shown in FIG. 4. The base polymeric support film is supplied to the UV inkjet printer via spool (20). The polymeric support film passes between rollers (22) and into inkjet printer (24). While passing through inkjet printer (24), printhead (26) deposits UV ink onto the polymeric support film (28), after which the UV ink is partially cured by lamp (30). Lamp (30) is preferably operating at power level low enough to hold the printed image in position without completely curing the ink. As stated above, in an alternative embodiment the UV light source could be filtered to remove light above a certain wavelength so as to only partially cure the UV ink. After the printed polymeric support film leaves the inkjet printer (24), now with an image printed thereon, a second polymeric film (32) is applied on top of the printed first polymeric film. The second polymeric film (32) is supplied by spool (34), and can be applied on top of the printed first polymeric film (28) through known laminate techniques. The combined laminate then passes under a second UV lamp (38) operating at or near full power, or alternatively is an unfiltered light source, so as to completely cure the UV ink printed image. The combined laminate, now with a completely cured image therebetween, is then wound on spool (40) and is now ready for further processing.

Figure 2:
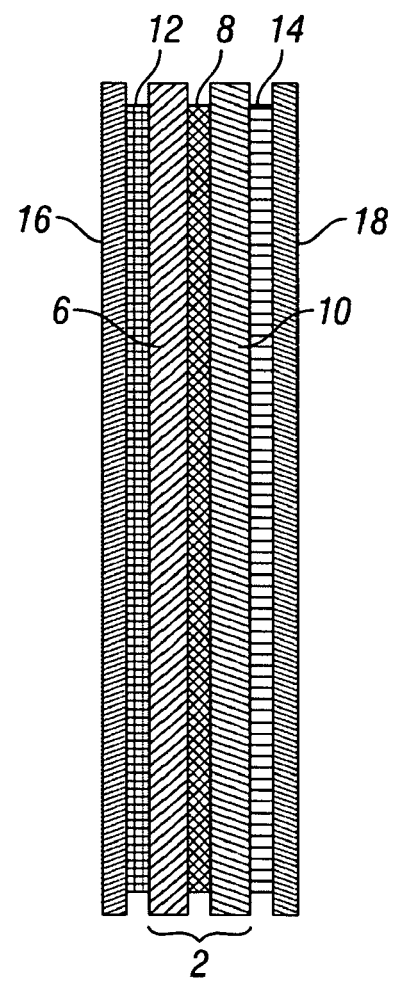
FIG. 2 shows a further embodiment of the laminate of the present invention.

The resulting printed polymeric support film (2) can then disposed between other layers, for example, two layers of plasticized PVB (12, 14), to form a multi-layer composite interlayer, such as the one shown in FIG. 2. Alternatively, a single layer may be disposed upon the polymeric film covering the printed image. The multi-layer composite interlayer can then be placed between two sheets of glass (16, 18), thereby forming the final laminated glass product. Alternatively, the aliphatic polyurethane or ethyl vinyl acetate layer could be applied to the printed polymeric support layer in the form of a topical adhesion promoter of UV print to glass or other film layer, if desired. For example, instead of placing a polymeric sheet onto the UV printed image, an EVA adhesive spray or PU liquid could be applied instead.

As shown in FIG. 2, after the printed polymeric support film (2) is adhered to the second polymeric film, the combined structure can then disposed between two adhesive layers (12, 14). Alternatively, a single adhesive layer can be disposed upon the second polymeric film. Adhesive layers that can be utilized with the present invention include polyurethane, ethylene vinyl acetate copolymer, plasticized polyvinyl chloride as well as other elastomeric polymers with energy absorbing properties and surface chemistry to provide adequate adhesion to glass and the polymeric support film and polymeric film layers. The preferred adhesive layer of the present invention is plasticized PVB.

Figure 5:
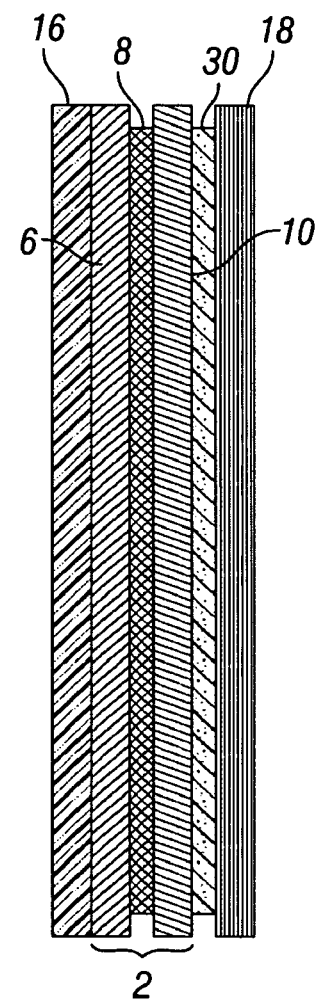
FIG. 5 shows a further embodiment of the laminate of the present invention.

In one embodiment, as described above, a single adhesive layer is disposed upon the second polymeric film. For example, as shown in FIG. 5, the printed composite interlayer (2) from FIG. 1, which contains an image printed on a polymeric support film, followed by a second polymeric film disposed upon the printed image, is then combined with a single adhesive layer (30) disposed upon the second polymeric film (10). For example, an image may be printed on a PVB layer, the printed side of the PVB layer would then be covered with a polyurethane layer, and finally a second PVB layer would be disposed upon the polyurethane layer.

The outer surface layers of the combined polymeric support and polymeric films in contact with the adhesive layers must be appropriately coated and/or treated to achieve adequate adhesion and laminate integrity. Preferred techniques are chemical modification of the outer polymeric support and polymeric films by flame treatment, chemical oxidation, corona discharge, carbon sputtering, plasma treatment in vacuum or in air, application of an adhesive, or other treatments well known to those of ordinary skill in the art.

For embodiments comprising poly(vinyl butyral), the poly(vinyl butyral) can be produced by known acetalization processes that involve reacting poly(vinyl alcohol) (PVOH) with butyraldehyde in the presence of an acid catalyst, followed by neutralization of the catalyst, separation, stabilization, and drying of the resin.

In various embodiments, the polymer sheet comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The polymer sheet can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer sheet comprises poly (vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/m (see, for example, U.S. Pat. Nos. 4,902,464; 4,874,814; 4,814,529; 4,654,179). As used herein, the term "molecular weight" means the weight average molecular weight.

Any of the agents provided in this "polymer sheet" section apply specifically to additional polymer sheet layers that are optionally used in interlayers of the present invention.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate).

Additives may be incorporated into the polymer sheet to enhance its performance in a final product. Such additives include, but are not limited to, the following agents: anti-blocking agents, plasticizers, dyes, pigments, stabilizers (e.g., ultraviolet stabilizers), antioxidants, flame retardants, IR absorbers, and combinations of the foregoing additives, and the like, as are known in the art.

In various embodiments of polymer sheets of the present invention, the polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of, for example, 40° C. or less, 35° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2 ethylhexanoate.

Any suitable method can be used to produce the polymer sheets of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

The poly(vinyl butyral) polymer, plasticizer, and additives can be thermally processed and configured into sheet form according to methods known to those of ordinary skill in the art.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a melted mixture of resin with a plasticizer and optionally other additives, for example, performance enhancing agents.

One exemplary method of forming a poly(vinyl butyral) sheet comprises extruding molten poly(vinyl butyral) comprising resin, plasticizer, and additives—the melt—by forcing the melt through a sheet die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet.

Performance enhancing agents of the present invention can be incorporated into polymer sheets by adding the performance enhancing agents to a melt and mixing the melt prior to formation of the polymer sheet. For embodiments in which an agent region is formed in a polymer sheet, performance enhancing agents can be added to a first melt which is coextruded with a second melt, wherein the second melt has, for example, no performance enhancing agent added. In other embodiments, a third melt comprising the performance enhancing agent can be coextruded as well to form the three region embodiment described elsewhere herein. The resulting sheets will have agent regions and non agent regions as described elsewhere herein.

The laminate of the present invention will most commonly be disposed between sheets of glass, preferably a pair of matching float glass sheets. The glass sheets can be any combination of any types of glass, including both clear glass and tinted glass, and including annealed, heat strengthened or tempered glass. The composite laminate of the present invention has the advantage that it can be used in the same manner and laminated employing the same equipment as that employed in forming conventional safety glass laminates, for example, process forming a safety glass laminate containing a single layer plasticized PVB safety film. The typical commercial safety glass lamination process comprises the following steps:

(1) hand assembly of the two pieces of glass and composite laminate;
(2) passing the assembly through a pressure nip roll at room temperature to expel trapped air;
(3) heating the assembly via IR radiant or convective means for a short period, typically until reaching a glass surface temperature of about 100° C.;

(4) passing the hot assembly through a second pair of nip rolls to give the assembly enough temporary adhesion to seal the edge of the laminate and allow further handling and (5) autoclaving the assembly typically at temperatures between 130 to 150° C. and pressures between 1050 to 1275 kN/sq·m for about 30 to 90 minutes.

Other means for use in de-airing of the plasticized PVB/glass interfaces (steps 2-4) known in the art and are commercially practiced include vacuum bag and vacuum ring processes in which vacuum is utilized to remove the air.

Acceptable end use performance requirements of a glass laminate include maintenance of structural integrity (that is, no interfacial separations) when subjected to external forces such as those imposed by wind, temperature, etc. In addition, the nonplanarity of heat strengthened or tempered glass if used for the fabrication of glass laminates can result in a force that may result in the separation of one or more layers. In order to avoid issues with laminate integrity it is essential that the interfacial adhesion of all surfaces within a glass laminate meet a minimum requirement. Measurement of the compressive shear strength of a laminate provides an adhesion measurement of the weakest interface. This result can be used as means to determine laminate integrity and the potential for interfacial delamination during installed use.

The compressive shear strength of a laminate is easily measured. Glass laminates for evaluation are prepared using conventional lamination methods which have been described above. Thickness of the glass layers used for the laminates is selected such that during testing, the plastic/glass interfaces are able to move freely within the test fixture. For each laminate type under evaluation a series of at least 6 circular test specimens with a diameter of 30 mm are cut from a larger piece of glass laminate using rotary diamond core drill with water cooling. Water cooling is adjusted to avoid excessive heating of the laminate and care is taken to minimize glass chipping. After the test specimens have been cut, they are conditioned overnight at 21 to 23° C. prior to testing.

To initiate the testing, the circular test specimen is placed into the recessed circular area of the stationary lower half of the test fixture after which the upper half of the test fixture is mated with the lower half. The assembled test fixture with loaded test specimen is then inserted into a testing apparatus such as an Alpha Technologies T20 Tensometer in which a crosshead can apply a measured force to the movable top surface of the test fixture. Once the crosshead makes contact with the top surface of the test fixture, the crosshead is moved at a constant rate of 3.2 mm/min and the maximum force required to shear the sample is determined. The interface at which failure occurs should be noted to identify the weakest interface. The measured force is then converted in compressive shear strength by dividing it by the cross-sectional area of the test specimen.

EXAMPLES

Example 1

A digital test image was printed on a layer of PVB using UV ink. This layer was then cured, and then laminated with two pieces of glass to form a finished glass laminate. The laminate featured vibrant coloration with good optical properties. Compressive shear adhesion was measured and found to be between 0-1 MPa.

Example 2

A digital test image was printed on a layer of PVB using UV ink. This layer was then cured and bonded to a second layer of PVB, and then laminated with two pieces of glass to form a finished glass laminate. Compressive shear adhesion was measured and found to be between 0-1 MPa, with failure being between the two PVB layers.

Example 3

A pink digital test image was printed on a layer of PVB using UV ink. This layer was then cured and bonded to a layer of polyurethane, and then laminated with two pieces of glass to form a finished glass laminate. The average compressive shear adhesion was measured to be 7.32 MPa, with failure being between the printed side of the PVB layer and the polyurethane layer.

Example 4

A black digital test image was printed on a layer of PVB using UV ink. This layer was then cured and bonded to a layer of polyurethane, and then laminated with two pieces of glass to form a finished glass laminate. The average compressive shear adhesion was measured to be 10.90 MPa, with failure being between the printed side of the PVB layer and the polyurethane layer.

Example 5

A pink digital test image was printed on a layer of PVB using UV ink. This layer was then cured and bonded to a layer of ethyl vinyl acetate, and then laminated with two pieces of glass to form a finished glass laminate. The average compressive shear adhesion was measured to be 7.12 MPa, with failure being between the printed side of the PVB layer and the ethyl vinyl acetate layer.

Example 6

A black digital test image was printed on a layer of PVB using UV ink. This layer was then cured and bonded to a layer of ethyl vinyl acetate, and then laminated with two pieces of glass to form a finished glass laminate. The average compressive shear adhesion was measured to be 13.11 MPa, with failure being between the printed side of the PVB layer and the ethyl vinyl acetate layer.

As shown in the above examples, when a UV image is printed upon a PVB substrate and then adhered to a second PVB layer, little or no shear resistance is measured when the laminate is separated. In contrast, when the UV image is printed upon a PVB substrate and adhered to a layer of PU or EVA, the shear improves dramatically, making the laminate available for use in a final glass laminate product. The preceding description is set forth for purposes of illustration only and is not to be taken in a limited sense. Various modifications and alterations will be readily apparent to persons skilled in the art. It is intended, therefore, that the foregoing be considered as exemplary only and that the scope of the invention be ascertained from the following claims.

I claim:

1. An interlayer for laminated glass, the interlayer comprising
a polymeric support film supporting at least one color image printed with UV ink and a polymeric film bonded to the polymeric support film, such that the color image is directly deposited on said polymeric support film and between the polymeric support film and the polymeric film, wherein the polymeric film is a thermoplastic sheet comprising a layer or coating of either polyurethane or ethyl vinyl acetate and wherein said polymeric support film is plasticized polyvinyl butyral.

2. The interlayer of claim 1, wherein the polymeric film is ethyl vinyl acetate.

3. The interlayer of claim 2, wherein the polymeric film is applied as a sheet.

4. The interlayer of claim 2, wherein the polymeric film is applied as a topical adhesion promoter.

5. The interlayer of claim 1, wherein the thermoplastic sheet is selected from the group consisting of polyvinyl butyral and polyethylene terephthalate.

6. The interlayer of claim 1, wherein the color image is printed on the polymeric support film using inkjet printing technology.

7. The interlayer of claim 1, wherein said interlayer is bonded between two adhesive layers.

8. The interlayer of claim 7, wherein the adhesive layers are individually selected from the group consisting of polyurethane, ethylene vinyl acetate copolymer, plasticized polyvinyl chloride and plasticized polyvinyl butyral.

9. The interlayer of claim 7, wherein the adhesive layers are plasticized polyvinyl butyral.

10. The interlayer of claim 1, further comprising an adhesive layer bonded to the polymeric film.

11. The interlayer of claim 10, wherein the adhesive layer is selected from the group consisting of polyurethane, ethylene vinyl acetate copolymer, plasticized polyvinyl chloride and plasticized polyvinyl butyral.

12. The interlayer of claim 10, wherein the adhesive layer is plasticized polyvinyl butyral.

13. The interlayer of claim 1, wherein the thickness of the polymeric film is less than or equal to one half the thickness of the polymeric support film.

14. The interlayer of claim 1, wherein the color image is selected from the group consisting of a logo, symbol, geometric pattern, photograph, alphanumeric characters and combinations thereof.

15. The laminated glass composite of claim 1, wherein said UV ink has an acrylic content.

16. A laminated glass composite comprising an image layer disposed between two glass sheets, the image layer comprising a polymeric support film supporting at least one color image printed with UV ink and a polymeric film bonded to the polymeric support film, such that the color image is directly deposited on said polymeric support film and between the polymeric support film and the polymeric film, wherein the polymeric film is a thermoplastic sheet comprising a layer or coating of either polyurethane or ethyl vinyl acetate and wherein said polymeric support film is plasticized polyvinyl butyral.

17. The laminated glass composite of claim 16, wherein the polymeric film is ethyl vinyl acetate.

18. The laminated glass composite of claim 16, wherein the polymeric film is applied as a sheet.

19. The laminated glass composite of claim 16, wherein the polymeric film is applied as a topical adhesion promoter.

20. The laminated glass composite of claim 16, wherein the thermoplastic sheet is selected from the group consisting of polyvinyl butyral and polyethylene terephthalate.

21. The laminated glass composite of claim 16, wherein the color image is printed on the polymeric support film using inkjet printing technology.

22. The laminated glass composite of claim 16, further comprising the image layer being bonded between two adhesive layers.

23. The laminated glass composite of claim 22, wherein the adhesive layers are individually selected from the group consisting of polyurethane, ethylene vinyl acetate copolymer, plasticized polyvinyl chloride and plasticized polyvinyl butyral.

24. The laminated glass composite of claim 22, wherein the adhesive layers are plasticized polyvinyl butyral.

25. The laminated glass composite of claim 16, further comprising an adhesive layer bonded to the polymeric film.

26. The laminated glass composite of claim 25, wherein the adhesive layer is selected from the group consisting of polyurethane, ethylene vinyl acetate copolymer, plasticized polyvinyl chloride and plasticized polyvinyl butyral.

27. The laminated glass composite of claim 25, wherein the adhesive layer is plasticized polyvinyl butyral.

28. The laminated glass composite of claim 16, wherein the thickness of the polymeric film is less than or equal to one half the thickness of the polymeric support film.

29. The laminated glass composite of claim 16, wherein the color image is selected from the group consisting of a logo, symbol, geometric pattern, photograph, alphanumeric characters and combinations thereof.

30. The laminated glass composite of claim 16, wherein said UV ink has an acrylic content.

* * * * *